United States Patent [19]

Belko

[11] 4,335,174
[45] Jun. 15, 1982

[54] HONEYCOMB STRUCTURE END CLOSURE
[75] Inventor: Raymond P. Belko, Blackwood, N.J.
[73] Assignee: The Boeing Company, Seattle, Wash.
[21] Appl. No.: 183,939
[22] Filed: Sep. 4, 1980
[51] Int. Cl.³ .......................... B32B 3/12; B32B 5/18
[52] U.S. Cl. ...................................... 428/73; 156/79; 156/306.9; 416/134 A; 428/76; 428/116; 428/119; 428/158; 428/161; 428/317.5
[58] Field of Search .................. 428/73, 83, 116, 118, 428/119, 120, 310, 158, 161; 156/79, 197, 306.9; 244/131, 133, 228, 229 R, 235, 239; 416/240, 136 A

[56] References Cited
U.S. PATENT DOCUMENTS
3,145,000  8/1964  Mackie .............................. 428/73
3,383,004  5/1968  Closner ............................. 428/73

*Primary Examiner*—Paul J. Thibodeau
*Attorney, Agent, or Firm*—Robert S. Lipton; Jack D. Puffer

[57] ABSTRACT

An end closure for honeycomb structures is disclosed. The end closure effectively provides for the sealing of the end of a honeycomb structure in order to prevent moisture from entering and propagating into the structure. The invention includes a structure and method for closing the end of a honeycomb structure with a molded closure. A foam adhesive, in combination with a tape adhesive, forces the tape adhesive to conform to the shape of the irregular honeycomb core, thereby providing an effective bond and seal of the honeycomb face.

6 Claims, 3 Drawing Figures

HONEYCOMB STRUCTURE END CLOSURE

BACKGROUND OF THE INVENTION

This invention relates generally to honeycomb structures and in particular, structures having a honeycomb core in combination with a skin material. An example of such structures are certain aircraft structures such as helicopter rotor blades. Helicopter rotor blades, depending upon the particular design, may have tip and root sections which must be sealed. Such sealing is required in order to prevent moisture from entering and propagating into the structure and causing a deterioration of the bonding materials which connect the skin to the honeycomb core. Sealing is accomplished, in part, by bonding an end closure to the exposed honeycomb face. The enclosure, which may be an elastomeric closure or a molded elastomeric end closure, generally wraps around and is also bonded to the skin. This problem is particularly severe in aircraft structures due to the wide range of temperatures and pressures encountered during operational use.

DESCRIPTION OF THE PRIOR ART

Current methods of sealing honeycomb structures utilize elastomeric materials or potting compounds. The bonding methods and mechanisms require improvement in that their failure rate has been found to be undesirable. One of the reasons has been due to the fact that it has been difficult, if not impossible, to bond the elastomeric closure to the irregular shape of the honeycomb core or pot the face without enclosing air bubbles or leaving edge voids, i.e., unbonded areas. These bubbles and edge voids expand due to changes in load, temperature and air pressure to cause a deterioration of the bond line. Of course, the deterioration of the bond line between the closure and the honeycomb core leads directly to a break in the seal, thus, permitting moisture to enter the structure.

SUMMARY OF THE INVENTION

It is an object of the present invention to provide and improved structure for an end closure for a honeycomb structure.

It is another object of the present invention to provide an elastomeric end closure for a honeycomb structure wherein there is a reliable bond between the closure and the honeycomb.

It is a further object of the present invention to provide an end closure for honeycomb structures which will provide improved sealing.

It is still a further object of the present invention to provide an end closure for honeycomb structures which will provide improved sealing and resistance to moisture entry and propagation thereby avoiding degradation of bond lines.

In accordance with the present invention an effective structure for sealing the ends of honeycomb structures is provided. The invention includes a method and structure of using an elastomeric closure to form the end of such honeycomb structures. Two different types of adhesives are used to bond the elastomeric closure to opposing skins and the interposed honeycomb core of a honeycomb structure. As will be described in greater detail, a foam adhesive is used to force a tape adhesive to conform to the irregular contours of the honeycomb core thereby providing a reliable bond line relatively free of air bubbles and other discontinuities.

Other objects, features and advantages of the present invention will be apparent from the description which follows taken together with the accompanying drawings in which like numerals refer to like parts.

DESCRIPTION OF THE PREFERRED EMBODIMENT

Figure 1:
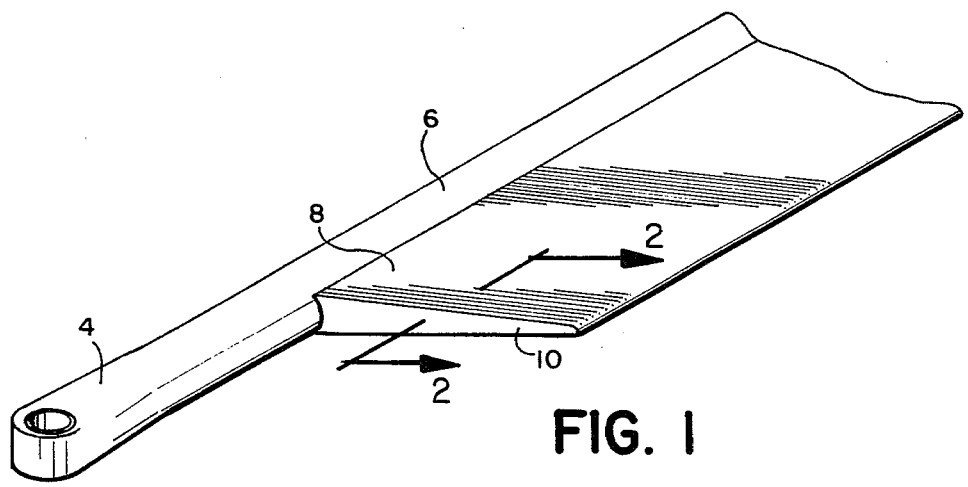
FIG. 1 is a perspective view of a portion of a helicopter rotor blade which utilizes the present invention.

Referring now to FIG. 1, a portion of a helicopter rotor blade is shown embodying the present invention. It is to be emphasized that the present invention is applicable to any honeycomb structure and that, accordingly, a helicopter rotor blade is being used by way of example only. The rotor blade 2 includes a spar 4 and an aerodynamic portion 6. The aerodynamic portion 6 includes trailing edge panel section 8 which are bonded to the trailing edge of the spar 4. The inboard end of the trailing edge panel section 8 is sealed with an elastomeric closure 10. As previously indicated, the closure 10 may be a complex shape, here shown as a uniform sheet.

Figure 2:
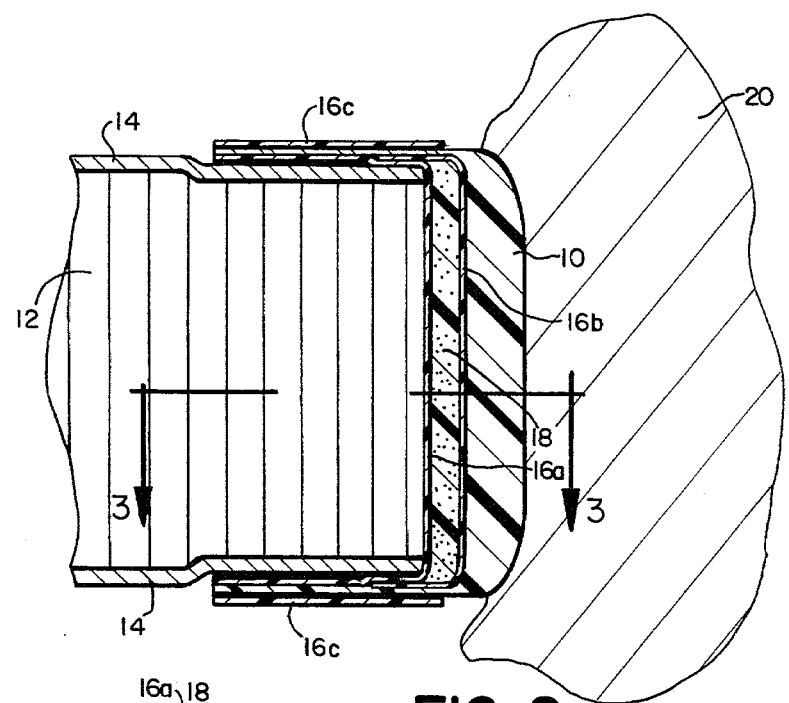
FIG. 2 is an exploded schematic view taken along line 2—2 of FIG. 1.

Referring now to FIG. 2 where an exaggerated and exploded view of the bond line connecting the elastomeric closure 10 to the trailing edge panel 8 is shown. It is to be noted that the view shown in FIG. 2 is schematic in nature and is more representative of the bond line between the panel 8 and the elastomeric closure 10 before curing.

The trailing edge portion 8 includes a honeycomb core 12 and skin 14. The elastomeric closure 10 is bonded to the panel 8 by using a variety of adhesives which bond the elastomeric closure 10 both to the skins 14 and the complete length of the core 12.

Initially, a sheet of tape adhesive 16a is laid up on one skin, the honeycomb core, around to the opposite skin. This is followed by the application of a layer of foam adhesive 18 along the end face of the panel 8. It is to be noted that the foam adhesive 18 does not flow around the corner and over the skin 14.

This step is the followed by the laying up of a second layer of tape adhesive 16b. The second layer of tape adhesive 16b is in contact with the first layer of tape adhesive 16a adjacent the skins 14. But, as shown, are separated from one another at the end of the panel 8 by the layer of foam adhesive 18. This is then followed by assembly of the elastomeric closure. The elastomeric closure is placed in contact with the second layer of tape adhesive 16b over the skins and along the end of the panel 8.

Although optional, a third layer of tape adhesive 16c may be used as an additional sealing medium. As shown, the third layer of tape adhesive is in contact with the elastomeric closure 10 and the skins 14. As indicated, the final layer of adhesive tape 16c could be eliminated, but is used for redundancy. For example, if a crack were to develop between the layer of tape adhesive 16a and skin 14 ambient moisture would be prevented from reaching such a crack by the bond between the tape adhesive 16c and the skin 14.

The elastomeric closure 10 and the tape adhesive 16 and foam adhesive 18 discussed thus far are in a uncured state. Subsequent to their being laid up, as described, the panel is placed in a mold. The panel 8 is then placed in a mold so that the end 8, which now includes the elastomeric closure 10, against a portion of the mold.

One of the primary reasons the present invention provides an improved method and structure for bonding an elastomeric closure to the end of a honeycomb panel is that a uniform bond, relatively free of air bubbles, is provided between the elastomeric closure 10 and the honeycomb core 12. This is due to the fact that the tape adhesive is pliable at the initiation of the curing process but before final curing where it, of course, becomes a relatively rigid solid structure. Additionally, the foam adhesive in addition to having similar characteristics expands during the initiation of the curing process. Of course, the foam adhesive also becomes a rigid solid subsequent to curing. However, during the curing process but prior to the completion thereof, the expansion of the foam adhesive forces the inner layer of tape adhesive 16a to flow into and about the rough and irregular channels formed by the end of the honeycomb core 12. Thus, the adhesives in combination are forced to completely fill and bond, void of air bubbles, the complicated and irregular surface shape of the end of the honeycomb core 12. This directly results in a uniform and effective bond and seal between the elastomeric closure 10 and the honeycomb panel 8.

The tape adhesive used in the present invention is FM 123-2, a trademark of American Cyanamid Corporation. This tape adhesive is water impermeable. As is well know, there are many different foam adhesives, most of which would perform effectively in the present invention. However, FM-37, also a trademark of American Cyanamid Corporation is used in the preferred embodiment. FM-37 is a modified nitrile epoxy with a kitscreen carrier. This particular foam adhesive is a high strength adhesive in contrast with some foam adhesives which have relatively low strength. The elastomeric closure 10, which provides the basic barrier to moisture, is made with BUNA-N. This particular elastomeric material is known for its excellent sealing properties, although it is also known for having relatively little strength. Of course, strength is not a requisite property for this particular application.

During the curing process the panel 8 is placed so as to abut the mold 20. A pressure of 150 pounds per square inch is then exerted against the skins 14. In the preferred embodiment of the invention, this pressure does not vary more than 25 pounds per square inch from the 150 pounds per square inch value. The curing of the adhesives then takes place at 250 degrees F. In the preferred embodiment of the invention the temperature does not vary more than plus or minus 20 degrees F. from that value. It should be noted that the expansion of the foam adhesive and the resultant pressure caused thereby, which forces the tape adhesive into the channels of the honeycomb core, is directly due to the heat of the curing process.

Figure 3:
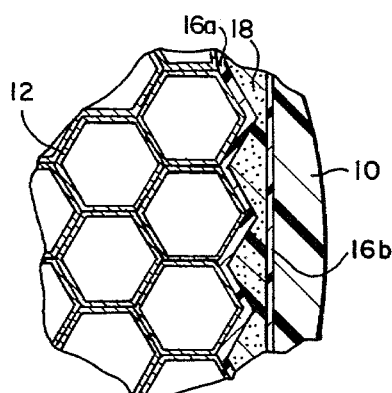
FIG. 3 is a portion of FIG. 2 showing the resultant bond line at the core/closure interface subsequent to curing.

An exploded view of the resultant bond, subsequent to curing, shown in FIG. 3. As is shown, the inner layer of tape adhesive 16a has been forced to conform with the irregular contour of the honeycomb core 12 by the foam adhesive 18. The foam adhesive has filled in the voids to a greater or lesser extent, due to its fluid nature prior to curing, so as to create a more uniform surface. The uniform surface formed by the foam adhesive 18 is adjacent the outer layer of tape adhesive 16b which is, in turn, bonded to the elastomeric closure 10. It is in this manner that the elastomeric closure 10 is bonded to the honeycomb core 12 along a uniform and void free bond line consisting of adhesives 16a, 18 and 16b. As may be readily seen, the honeycomb core is more than adequately protected against permeation by ambient mositure.

It is to be noted that the present invention provides redundant sealing. Accordingly the second adhesive tape layer 16(b) may be omitted. The bonding of the closure 10 to the skins 14 consitutes a seal, as does the bonding of the closure 10 to the honeycomb 12. Water gets to the latter seal if the former fails.

Thus, it is apparent that there has been provided in accordance with the invention a method and structure which fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. In a honeycomb structure, a method of securing and sealing an end closure to an otherwise exposed honeycomb core end section which comprises:
positioning a tape adhesive adjacent the exposed honeycomb core;
placing a foam adhesive adjacent the tape adhesive;
positioning the end closure material outboard from the foam adhesive; and
curing said adhesives whereby said foam adhesive forces said tape adhesive to conform with the contours of the honeycomb core.

2. The method of claim 1 which further includes the placing of a second layer of tape adhesive between the end closure and the foam adhesive prior to said curing.

3. The method of claim 2 applied to a honeycomb structure having the honeycomb core connected to a skin wherein the tape adhesive, second layer of tape adhesive, and the end closure are wrapped around the exposed portion of the honeycomb core so as to place the layer of tape adhesive in contact with the skin, prior to curing so that subsequent to the curing the end closure is bonded to the skin.

4. The method of claim 3 wherein a third layer of tape adhesive is positioned over a portion of the skin and the end closure prior to curing.

5. A helicopter rotor blade comprising:
a honeycomb core sandwiched between outer skins secured to the major surfaces of the core, said core having an irregular surface about its exposed periphery;
a first adhesive tape layer adjacent to the irregular surface of the honeycomb core and substantially conforming to said irregular surface;
a second foamed adhesive layer adjacent to the first adhesive layer; and
an enclosing skin formed around the exposed periphery of the honeycomb core and attached thereto by the second adhesive means.

6. The invention of claim 5 which further includes a third layer of adhesive tape formed over said second layer of adhesive.

* * * * *

UNITED STATES PATENT AND TRADEMARK OFFICE
CERTIFICATE OF CORRECTION

PATENT NO. : 4,335,174

DATED : June 15, 1982

INVENTOR(S) : RAYMOND P. BELKO

It is certified that error appears in the above–identified patent and that said Letters Patent are hereby corrected as shown below:

--Column 1, line 5, insert the statement: The invention herein described was made in the course of or under a contract or subcontract thereunder (or grant) with the Department of the Army.

Signed and Sealed this

Seventh Day of December 1982

[SEAL]

Attest:

GERALD J. MOSSINGHOFF

Attesting Officer

Commissioner of Patents and Trademarks